United States Patent
Lee et al.

(10) Patent No.: US 11,335,240 B2
(45) Date of Patent: May 17, 2022

(54) ELECTRONIC DEVICE INCLUDING DISPLAY DRIVING CIRCUIT FOR DISPLAYING CORRECTED TIME INFORMATION ON BASIS OF TEMPERATURE INFORMATION

(71) Applicant: Samsung Electronics Co., Ltd., Gyeonggi-do (KR)

(72) Inventors: Yohan Lee, Gyeonggi-do (KR); Jongkon Bae, Gyeonggi-do (KR); Yunpyo Hong, Gyeonggi-do (KR); Dongkyoon Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/261,262

(22) PCT Filed: Jun. 4, 2019

(86) PCT No.: PCT/KR2019/006685
§ 371 (c)(1),
(2) Date: Jan. 19, 2021

(87) PCT Pub. No.: WO2020/032367
PCT Pub. Date: Feb. 13, 2020

(65) Prior Publication Data
US 2021/0295765 A1    Sep. 23, 2021

(30) Foreign Application Priority Data

Aug. 9, 2018   (KR) ........................ 10-2018-0092745

(51) Int. Cl.
*G09G 3/00*    (2006.01)
*G09G 3/20*    (2006.01)
*G01K 13/00*   (2021.01)

(52) U.S. Cl.
CPC ........... *G09G 3/2096* (2013.01); *G01K 13/00* (2013.01); *G09G 3/00* (2013.01); *G09G 2310/08* (2013.01); *G09G 2320/041* (2013.01)

(58) Field of Classification Search
CPC ............. G09G 3/2096; G09G 2310/08; G09G 2320/041; G01K 13/00
See application file for complete search history.

(56) References Cited

U.S. PATENT DOCUMENTS 9,626,896 B2    4/2017   Lee et al.
10,269,292 B2   4/2019   Bae et al.
(Continued)

FOREIGN PATENT DOCUMENTS

KR    20-0379897        3/2005
KR    10-0687230 B1     2/2007
(Continued)

*Primary Examiner* — Towfiq Elahi
(74) *Attorney, Agent, or Firm* — Cha & Reiter, LLC

(57) ABSTRACT

Disclosed is an electronic device including a display panel, an oscillator generating a clock signal, a display driving integrated circuit (DDI) generating first time information, using the clock signal, a sensor, and at least one processor identifying a variable measured by using the sensor or second time information corresponding to a reference time. The at least one processor is configured to measure a variable, using the sensor, to correct an error time between the first time information and second time information corresponding to a reference time, based on the variable, and to deliver the corrected error time or the second time information to the DDI such that the DDI corrects the first time information based on the corrected error time to display a screen of the display panel. Besides, various embodiments as understood from the specification are also possible.

13 Claims, 14 Drawing Sheets

(56) References Cited

U.S. PATENT DOCUMENTS

| | | | |
|---|---|---|---|
| 2007/0092035 A1* | 4/2007 | Kim | H04B 1/3888 |
| | | | 375/296 |
| 2014/0368479 A1* | 12/2014 | Bae | G09G 5/18 |
| | | | 345/204 |
| 2015/0325213 A1* | 11/2015 | Lee | G09G 3/2096 |
| | | | 345/213 |
| 2018/0061309 A1 | 3/2018 | Bae et al. | |
| 2020/0279522 A1 | 9/2020 | Bae et al. | |

FOREIGN PATENT DOCUMENTS

| | | |
|---|---|---|
| KR | 10-1061433 B1 | 9/2011 |
| KR | 10-2014-0022986 A | 2/2014 |
| KR | 10-2015-0127319 A | 11/2015 |
| WO | 2018/044052 A1 | 3/2018 |

* cited by examiner

ELECTRONIC DEVICE INCLUDING DISPLAY DRIVING CIRCUIT FOR DISPLAYING CORRECTED TIME INFORMATION ON BASIS OF TEMPERATURE INFORMATION

CROSS REFERENCE TO RELATED APPLICATIONS

This application is a National Phase Entry of PCT International Application No. PCT/KR2019/006685, which was filed on Jun. 4, 2019, and claims a priority to Korean Patent Application No. 10-2018-0092745, which was filed on Aug. 9, 2018, the contents of which are incorporated herein by reference.

TECHNICAL FIELD

Embodiments disclosed in the disclosure relate to a technology in which a display driver integrated circuit (DDI) displays a screen of a display panel based on accurate time information by correcting an error of a clock signal depending on measured information.

BACKGROUND ART

An electronic device includes a display panel displaying a screen and a DDI driving the display panel. The DDI may display a screen, in which the display panel includes time information, by transmitting a synchronization signal. The DDI generates the synchronization signal used to display a screen, using a clock signal.

The clock signal is configured to be generated by an oscillator. The frequency of the clock signal may vary depending on environmental factors such as a change in temperature of the oscillator. When the frequency of the clock signal is changed, the error of the clock signal may occur by comparing the clock signal with a reference clock generated by at least one processor. A technology that the processor supplies the reference clock to the DDI, and the DDI corrects the frequency of the clock signal by comparing the clock signal of the oscillator with the reference clock may be used to compensate for the error between the clock signal and the reference clock.

DISCLOSURE

Technical Problem

An electronic device may provide an always-on-display (AOD) function that displays a screen regardless of whether a user utilizes the electronic device. The AOD function may maintain a specific region of a screen in a display state at all times, without supplying power to at least a partial configuration of the electronic device. When the electronic device displays the screen with the AOD function, the processor may not supply a reference clock to a DDI. When the DDI does not receive the reference clock, a correction method of comparing the clock signal and the reference clock may not be used. Accordingly, when the correction method using the reference clock is not applied in the AOD situation, the error time occurring in the clock signal may increase.

Embodiments disclosed in this specification are intended to provide the electronic device for solving the above-described problem and problems brought up in this specification.

Technical Solution

According to an embodiment disclosed in this specification, an electronic device may include a display panel, an oscillator generating a clock signal, a display driving integrated circuit (DDI) generating first time information, using the clock signal, a sensor, and at least one processor identifying a variable measured by using the sensor or second time information corresponding to a reference time. The at least one processor may be configured to measure a variable, using the sensor, to correct an error time between the first time information and second time information corresponding to a reference time, based on the variable, and to deliver the corrected error time or the second time information to the DDI such that the DDI corrects the first time information based on the corrected error time to display a screen of the display panel.

Furthermore, according to an embodiment disclosed in this specification, an electronic device may include a display panel, an oscillator generating a clock signal, a DDI displaying first time information generated by using the clock signal, through the display panel, a temperature sensor, and at least one processor identifying temperature information measured by using the temperature sensor or second time information corresponding to a reference time. The at least one processor may be configured to identify temperature information of the electronic device, using the temperature sensor, to correct an error time occurring during a specified time, depending on the temperature information in association with the first time information, and to deliver the corrected error time or second time information corresponding to a reference time to the DDI such that the DDI corrects the first time information based at least on the corrected error time to display the corrected first time information through the display panel during the specified time.

Moreover, according to an embodiment disclosed in this specification, an electronic device may include a display panel, a DDI including an oscillator generating a clock signal, a measurement sensor including a temperature sensor, and at least one processor operatively connected to the DDI and the measurement sensor. The processor may be configured to identify temperature information of an electronic device by using a temperature sensor, to correct an error time occurring during a specified time depending on the temperature information with regard to first time information generated by using a clock signal by the DDI and to deliver the corrected error time and second time information corresponding to a reference time to the DDI such that the DDI corrects the first time information based at least on the corrected error time.

Advantageous Effects

According to embodiments disclosed in this specification, even when an electronic device provides an AOD function, an electronic device may display the screen of a display panel by minimizing a time error.

Furthermore, according to embodiments disclosed in this specification, a processor may reduce a frequency at which corrected error time information is delivered to a DDI, thereby reducing power consumption.

Moreover, according to embodiments disclosed in this specification, the maximum error range of a clock signal may be reduced as compared with a reference clock.

Also, embodiments disclosed in this specification, a phenomenon that a period where the DDI corrects time information based on the corrected error time information is visually perceived on the display panel may be reduced.

Besides, a variety of effects directly or indirectly understood through the specification may be provided.

With regard to description of drawings, the same or similar components will be marked by the same or similar reference signs.

MODE FOR INVENTION

Hereinafter, various embodiments of the disclosure will be described with reference to accompanying drawings. However, it should be understood that this is not intended to limit the disclosure to specific implementation forms and includes various modifications, equivalents, and/or alternatives of embodiments of the disclosure.

Figure 1:
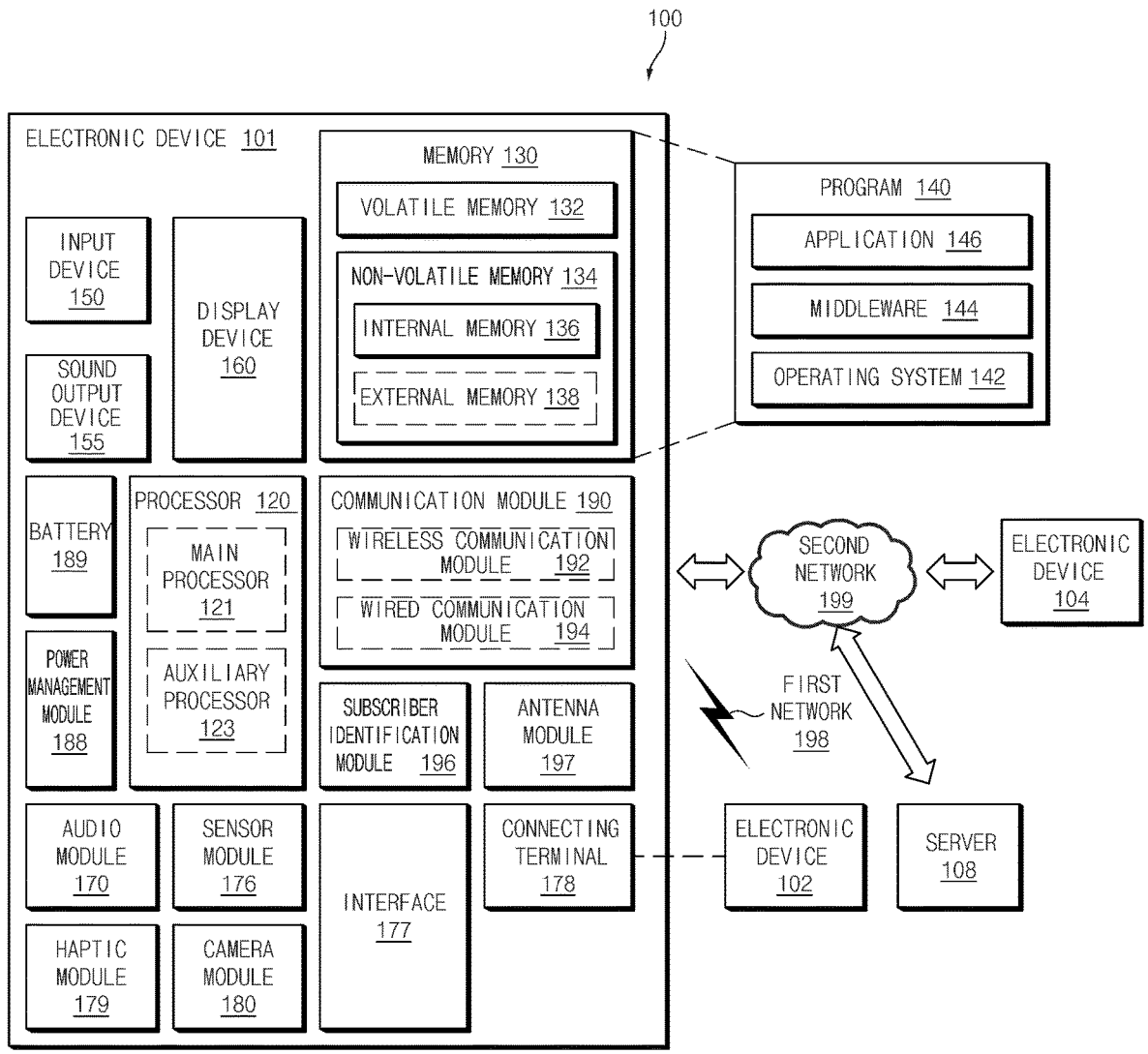
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (MI) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB).

According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
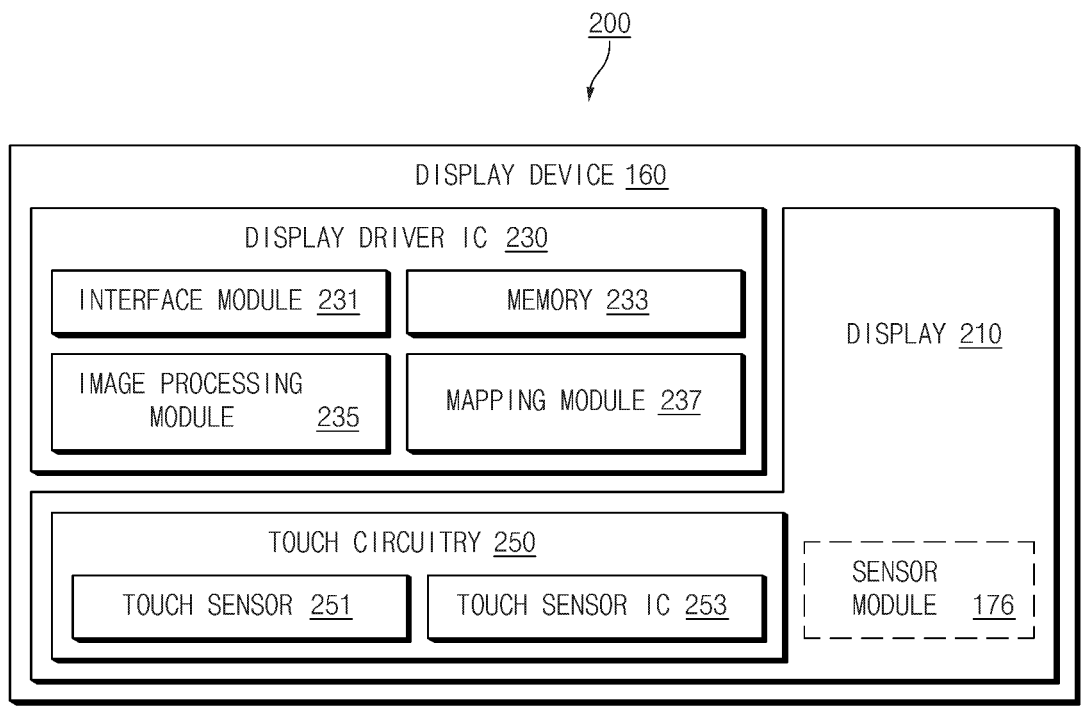
FIG. 2 is a block diagram illustrating the display device according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
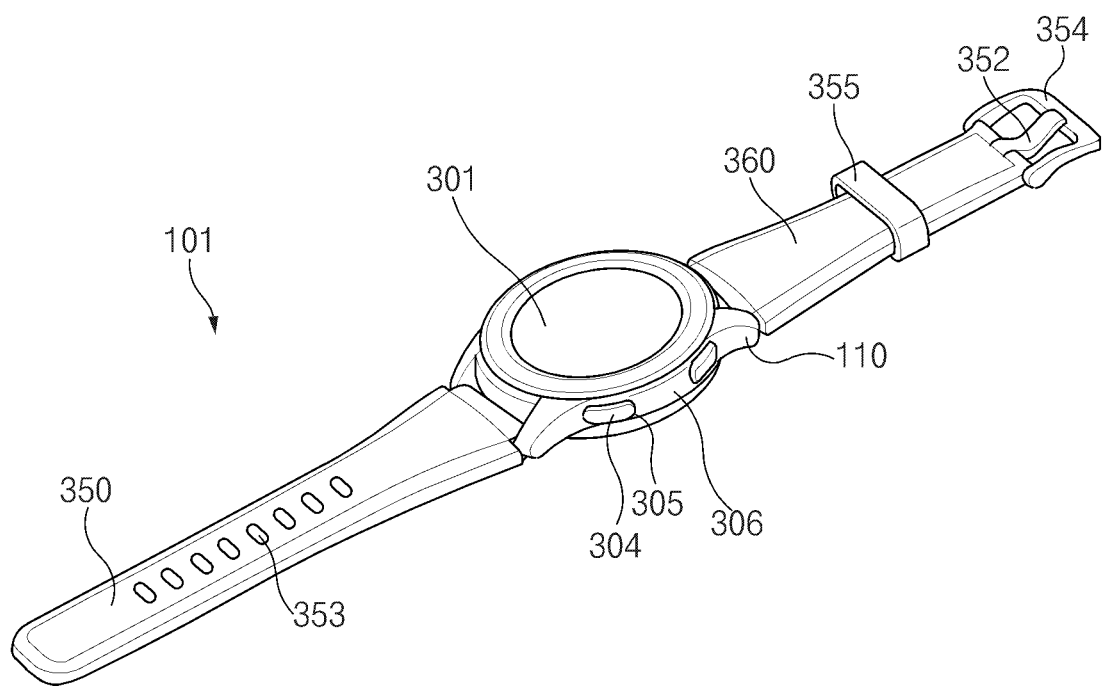
FIG. 3A is a front perspective view of an electronic device according to an embodiment.
Figure 3B:
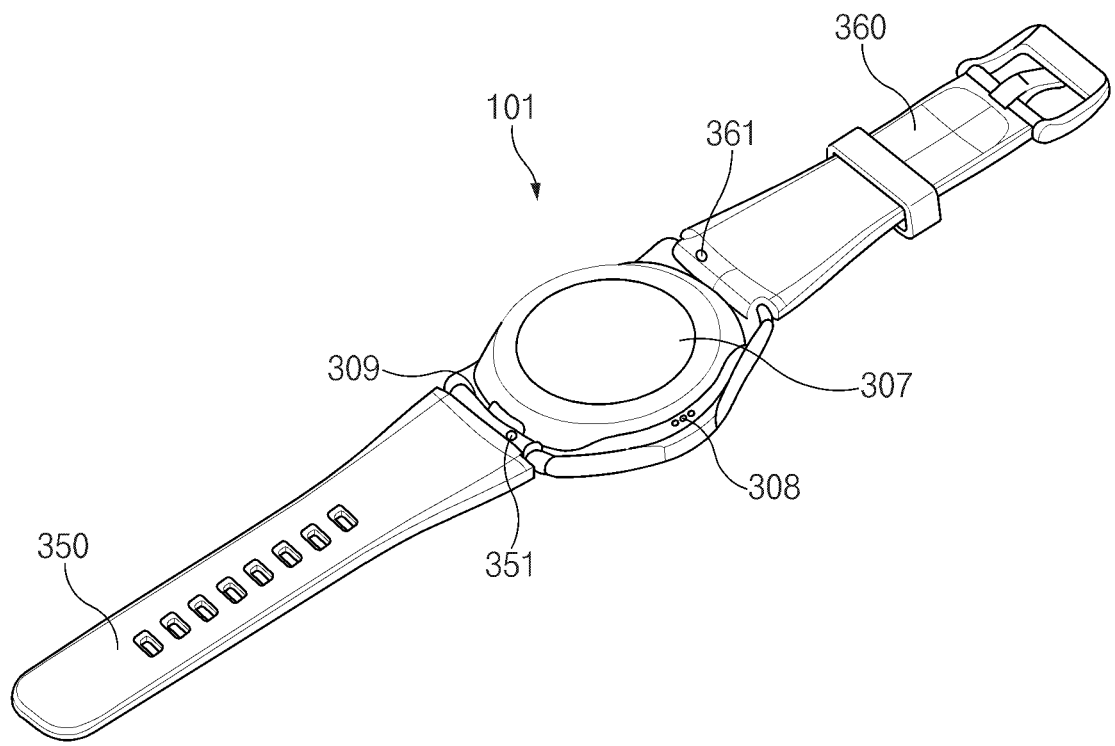
FIG. 3B is a back perspective view of an electronic device according to an embodiment.

FIG. 3A is a front perspective view of the electronic device 101 according to an embodiment. FIG. 3B is a back perspective view of the electronic device 101 according to an embodiment.

According to an embodiment, the electronic device 101 may be a wearable electronic device that a user is capable of wearing while carrying. In this specification, the wearable electronic device may be referred to as the electronic device 101. For example, as illustrated in FIGS. 3A and 3B, the electronic device 101 may be a smart watch that displays information such as time, weather, a battery, or a notification among wearable electronic devices. However, the embodiment is not limited thereto, and the electronic device 101 may be a smart watch, a smart glass, a chest pad measuring a heart rate, or an earbud. Furthermore, the electronic device 101 may be a portable electronic device such as a mobile phone or a tablet in addition to a wearable electronic device. In this specification, it is described that the wearable electronic device is a representative example of the electronic device 101. However, the same description may be applied to a mobile phone or a tablet within a range that is apparent to those skilled in the art.

According to an embodiment, the electronic device 101 may include a housing 110 surrounding the rear surface, the side surface, and the front surface of a watch screen 301, and binding members 350 and 360, which are connected to at least part of the housing 110 and for detachably binding the electronic device 101 to a user's body part (e.g., a wrist, an ankle, or the like). In FIGS. 3A and 3B, it is illustrated that the electronic device 101 includes the binding members 350 and 360. In an embodiment, it may mean that a wearable device or an electronic device is only the body including the display, excluding the binding members 350 and 360.

According to an embodiment, the front surface of the housing 110 may be implemented with a front plate (e.g., a glass plate including various coating layers, or a polymer plate), at least part of which is substantially transparent.

The rear surface of the housing 110 may be formed by a rear plate 307 which is substantially opaque. For example, the rear plate 307 may be implemented with a coated or colored glass, a ceramic, a polymer, a metal (e.g., aluminum, stainless steel (STS), or magnesium), or the combination of at least two of the materials. The side surface of the housing 110 may be coupled with the front plate or the rear plate 307 and may be implemented with a side bezel structure (or a "side member") 306 including a metal and/or a polymer. The rear plate 307 and the side bezel structure 306 may be integrally formed and may include the same material (e.g., a metal material such as aluminum).

According to an embodiment, the binding members 350 and 360 may be formed in various materials and shapes. The binding members 350 and 360 may be formed such that the integral type and a plurality of unit links are capable of being moved with each other by woven fabric, leather, rubber, urethane, metal, ceramic, or the combination of at least two of the materials.

According to an embodiment, the electronic device 101 may include at least one or more of the watch screen 301, audio modules 305 and 308, a sensor module (e.g., the sensor module 176 of FIG. 2), a key input device 304, or a connector hole 309. For example, the electronic device 101 may not include at least one (e.g., the key input device 304, the connector hole 309, or the sensor module 176) of the components or may further include any other component.

According to an embodiment, the watch screen 301 may be exposed through a significant portion of the front plate. The shape of the watch screen 301 may be a shape corresponding to the shape of the front plate. For example, the watch screen 301 may have various shapes such as a circle, an oval, a rectangle, a rectangle with rounded corners, a polygon, or the like. The watch screen 301 may be coupled to a touch sensing circuit, a pressure sensor capable of measuring the intensity (or pressure) of a touch, and/or a fingerprint sensor or may be disposed adjacent thereto.

According to an embodiment, the audio modules 305 and 308 may include the microphone hole 305 and the speaker hole 308. A microphone for obtaining external sound may be disposed inside the microphone hole 305; in any embodiment, a plurality of microphones may be disposed inside the microphone hole 305. The speaker hole 308 may be used as an external speaker and a call receiver. In any embodiment, the speaker hole 308 and the microphone hole 305 may be implemented with one hole, or a speaker (e.g., a piezo speaker) may be included without the speaker hole 308.

According to an embodiment, the sensor module 176 may generate an electrical signal or a data value that corresponds to an internal operation state of the electronic device 101 or corresponds to an external environment state. The sensor module 176 may be disposed inside the housing 110 of the electronic device 101. The sensor module 176 may include at least one or more of a biometric sensor (e.g., a HRM sensor), a gesture sensor, a gyro sensor, a barometric pressure sensor, a magnetic sensor, an acceleration sensor, a grip sensor, a color sensor, an infrared (IR) sensor, a temperature sensor, a humidity sensor, or an illumination sensor.

According to an embodiment, the key input device 304 may be a side key button disposed on the side surface of the housing 110. In another embodiment, the electronic device 101 may include key input devices 304 and a soft key on the display.

According to an embodiment, the connector hole 309 may accommodate a connector (e.g., a USB connector) for transmitting/receiving power and/or data with an external electronic device and may include another connector hole capable of accommodating a connector for transmitting/receiving an audio signal with the external electronic device. For example, the electronic device 101 may further include a connector cover that covers at least part of the connector hole 309 and blocks the inflow of external foreign substances to the connector hole.

According to an embodiment, the binding members 350 and 360 may be detachably bound to at least a partial region of the housing 110, using locking members 351 and 361. The binding members 350 and 360 may include at least one or more of a fixing member 352, a fixing member fastening hole 353, a band guide member 354, and a band fixing ring 355.

According to an embodiment, the fixing member 352 may be configured to fix the housing 110 and the binding members 350 and 360 to the user's body part (e.g., a wrist, an ankle, or the like). The fixing member fastening hole 353 may fix the housing 110 and the binding members 350 and 360 to the user's body part in compliance with the fixing member 352. The band guide member 354 may be configured to limit the motion range of the fixing member 352 when the fixing member 352 is fastened with the fixing member fastening hole 353, and thus may allow the binding members 350 and 360 to be bound to the user's body part while being in close contact. In a state where the fixing member 352 is fastened to the fixing member fastening hole 353, the band fixing ring 355 may limit the motion range of the binding members 350 and 360.

Figure 4A:
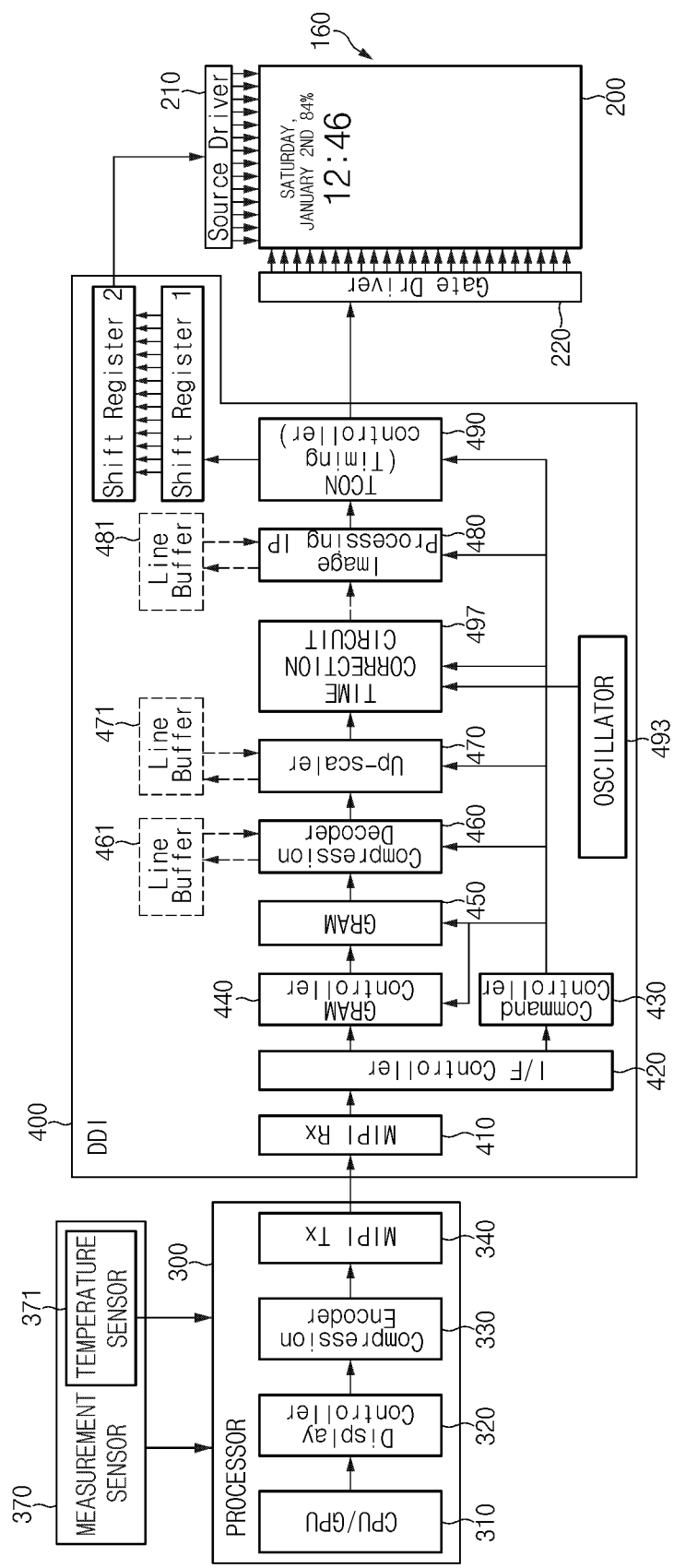
FIGS. 4A and 4B are diagrams illustrating a measurement sensor, at least one processor, a DDI, and a display of an electronic device according to an embodiment.
Figure 4B:
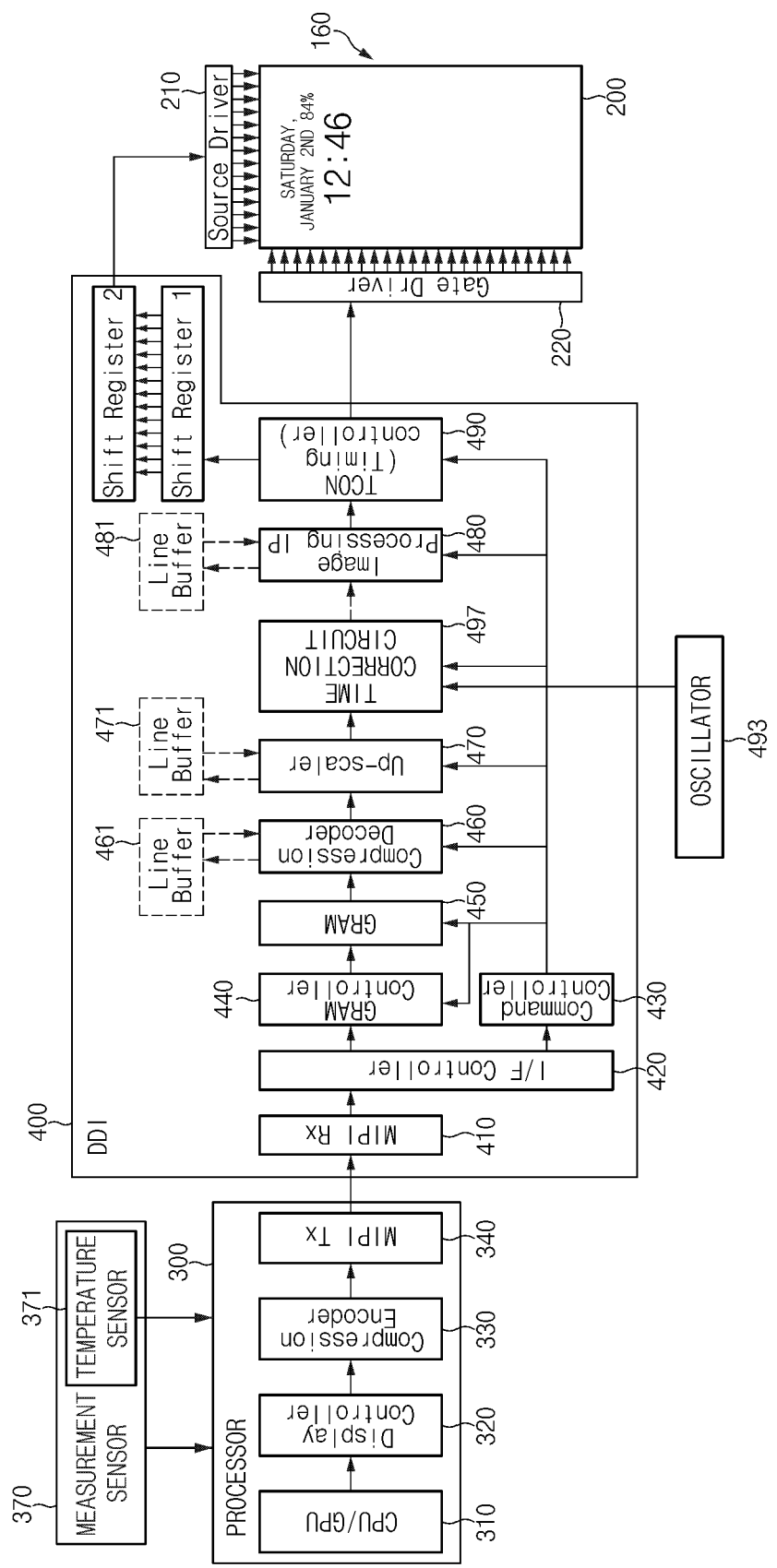

FIGS. 4A and 4B are diagrams illustrating a measurement sensor 370, at least one processor 300, a DDI 400, and the display 160 of the electronic device 101 according to an embodiment.

According to an embodiment, the measurement sensor 370 may measure various kinds of physical variables. The measurement sensor 370 may supply information associated with the measured variable to the at least one processor 300. In this specification, the measurement sensor 370 may be referred to as a sensor. For example, the measurement sensor 370 may include a temperature sensor 371 that measures temperature information. The temperature sensor 371 may generate temperature information by measuring the temperature at a periphery of the DDI 400. The temperature sensor 371 may deliver temperature information to the at least one processor 300.

According to an embodiment, the measurement sensor 370 may not be disposed inside the electronic device 101, but may be disposed outside the electronic device 101. For example, the measurement sensor 370 may be included in an external electronic device that communicates with the electronic device 101. The external electronic device may generate a measurement value by measuring a variable using the measurement sensor 370. The electronic device 101 may receive the measurement value from the external electronic device, using the communication module 190.

According to an embodiment, the measurement sensor 370 may be directly connected to the DDI 400 without passing through the at least one processor 300. The measurement sensor 370 may directly deliver the measurement value to the DDI 400.

According to an embodiment, the DDI 400 may be connected to the temperature sensor 371. The DDI 400 may directly identify the temperature of the electronic device 101, for example, the internal temperature of the DDI 400. According to an embodiment, the at least one processor 300 may generate image data. The at least one processor 300 may provide the generated image data to the DDI 400. The at least one processor 300 may include at least one of an application processor (AP), a communication processor (CP), or a sensor hub. The at least one processor 300 may include a CPU/GPU 310, a display controller 320, a compression module 330 (e.g., a compression encoder), or an internal transmission interface 340 (e.g., a mobile industry processor interface (MIPI)) Tx). Besides, the at least one processor 300 may receive a variable measured by the measurement sensor 370 or temperature information generated by the temperature sensor 371.

According to an embodiment, the CPU/GPU 310 may process an arithmetic operation of data to be displayed on the display 160 in response to scheduled information or in response to a user input. The CPU/GPU 310 may transmit the processed data to the display controller 320.

According to an embodiment, the display controller 320 may generate data to be delivered to the DDI 400 based on data delivered by the CPU/GPU 310.

According to an embodiment, the compression module 330 may encode image data generated in the display controller 320 in a specified manner (e.g., a display stream compression (DSC) scheme defined in Video Electronics Standards Association (VESA)). The compression module 330 may compress image data generated by the display controller 320 to reduce a data size. However, the disclosure is not limited thereto, and the compression module 330 may be omitted. In this case, the image data may be delivered to the DDI 400 without a compression process.

According to an embodiment, the internal transmission interface 340 may deliver image data encoded by the compression module 330 or information for controlling an operation timing of the DDI 400 to the DDI 400.

According to an embodiment, the DDI 400 may deliver image data received from the at least one processor 300 to the display 160. The DDI 400 may include an internal receive interface 410 (e.g., MIPI Rx), an interface controller 420, a command controller 430, a memory controller 440, a memory 450 (e.g., graphic RAM (GRAM)), a decompression module 460 (e.g., a compression decoder), an up-scaler 470, a time correction circuit 497, an image pre-processing unit (image processing IP) 480, and a timing controller (TCON) 490. In addition, the DDI 400 may further include a line buffer 461 associated with an operation of the decompression module 460, a line buffer 471 associated with an operation of the up-scaler 470, or a line buffer 481 associated with an operation of the image pre-processing unit 480. In addition, the DDI 400 may further include at least one shift register for receiving data from the TCON 490 and delivering the data to the display 160.

According to an embodiment, the internal receive interface 410 may communicate with the at least one processor 300. The internal receive interface 410 may receive image data or control information from the at least one processor 300. The internal receive interface 410 may receive control information or image data through the internal transmission interface 340 and may deliver the received image data to the interface controller 420.

According to an embodiment, the interface controller 420 may receive the image data from the internal receive interface 410. The interface controller 420 may deliver the received image data to the command controller 430 and the memory controller 440.

According to an embodiment, the command controller 430 may control one or more of the memory controller 440, the memory 450, the decompression module 460, or the TCON 490 such that the image data stored in the memory 450 is output to the specified region of a display panel 200 at the specified frame rate (e.g., 60 Hz). The command controller 430 may be referred to as control logic.

According to an embodiment, the memory controller 440 may write the image data received from the interface controller 420 to the memory 450. For example, under the control of the at least one processor 300, the memory controller 440 may write the delivered image data to the memory 450 at a specified frame rate.

According to an embodiment, the memory 450 may store and process the image data delivered by the memory controller 440. For example, the memory 450 may store the image data at a specified frame rate.

According to an embodiment, the decompression module 460 may decode at least part of image data stored in the memory 450 in a specified manner, and may deliver the decoded image data to the TCON 490. When the image data selected by the command controller 430 is not encoded, the decompression module 460 may be omitted or bypassed. The up-scaler 470 and/or the image pre-processing unit 480 may be interposed between the decompression module 460 and the TCON 490.

According to an embodiment, the up-scaler 470 may enlarge the decompressed image at a specified magnification. When there is a need to enlarge the image data depending on the size of the image data or user settings, the up-scaler 470 may enlarge the corresponding image data to be output to the display panel 200. When there is no need to enlarge the image data, the up-scaler 470 may be omitted or bypassed.

According to an embodiment, the electronic device 101 may include an oscillator 493. For example, as illustrated in FIG. 4A, the oscillator 493 may be embedded in the DDI 400. For another example, as illustrated in FIG. 4B, the oscillator 493 may be disposed outside the DDI 400.

According to an embodiment, the oscillator 493 may be configured to generate a clock signal. The oscillator 493 may supply a clock signal to the time correction circuit 497. The oscillator 493 may be disposed adjacent to the DDI 400.

According to an embodiment, the time correction circuit 497 may generate first time information, using the clock signal received from the oscillator 493. The time correction circuit 497 may correct the first time information.

According to an embodiment, the image pre-processing unit 480 may improve the image quality of image data. The image pre-processing unit 480 may include, for example, a pixel data processing circuit, a pre-processing circuit, a gating circuit, and the like.

According to an embodiment, the TCON 490 may generate various control signals for controlling the driving timing of the display 160. The TCON 490 may deliver the image data to a source driver 210. The TCON 490 may control the gate signal output of a gate driver 220.

According to an embodiment, the display 160 may include the display panel 200, the source driver 210, and the gate driver 220. In addition, the display 160 may further include a touch panel, a touch IC, a pressure sensor, a pressure sensor IC, a digitizer, or the like, which is associated with a user input.

According to an embodiment, the display panel 200 may display a screen. The display panel 200 may display a screen according to the image data received from the DDI 400.

According to an embodiment, the source driver 210 may supply a data voltage to the data line of the display panel 200 based on the source control signal received from the TCON 490. The gate driver 220 may supply a scan signal to a scan line of the display panel 200 based on the gate control signal received from the TCON 490.

According to an embodiment, at least one operation of the various operations (e.g., the check of a measurement value or the compensation of error information) described as being performed by the at least one processor 300 may be performed through the DDI 400.

Figure 5A:
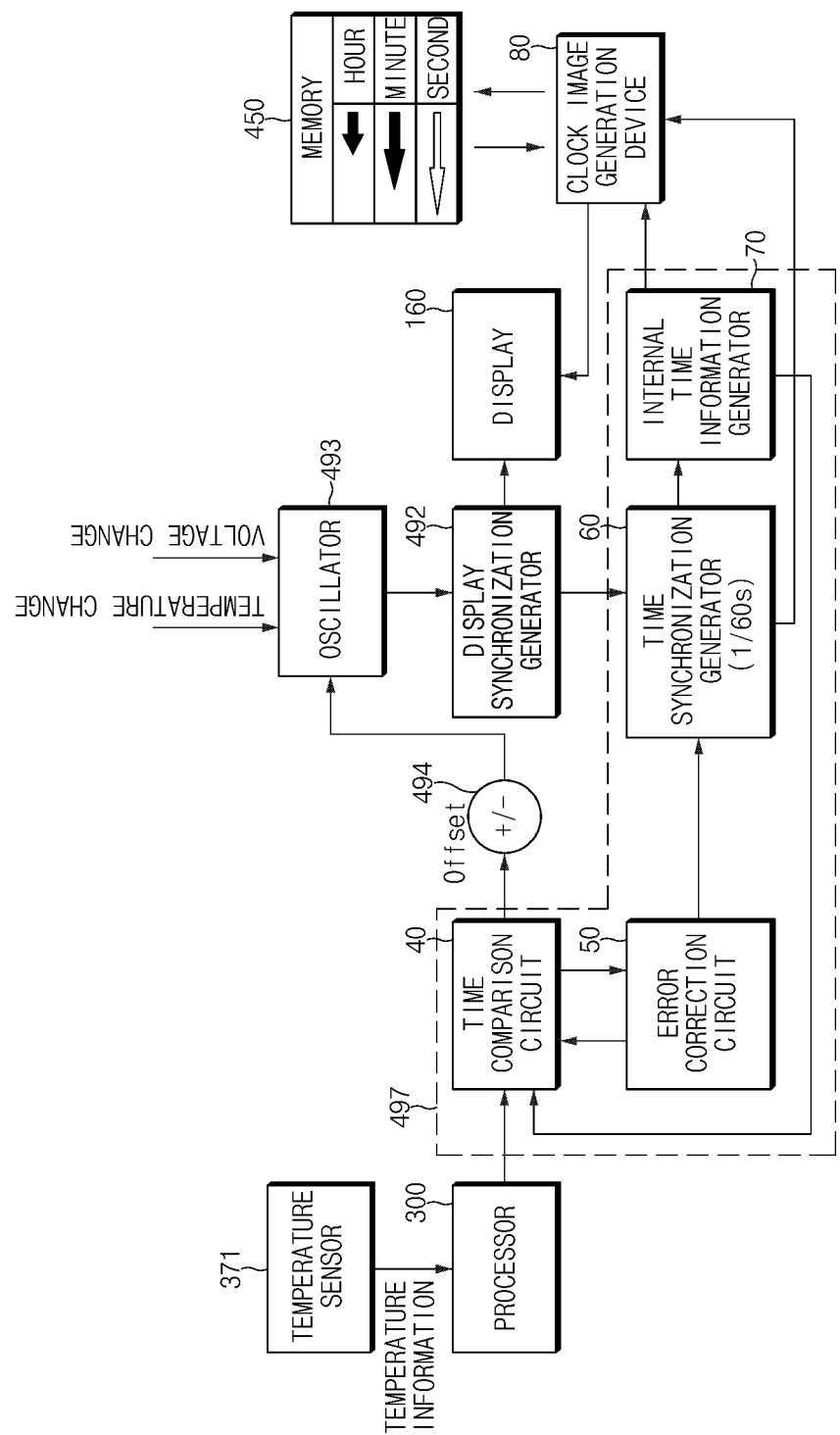
FIGS. 5A and 5B are diagrams illustrating a time correction circuit and related peripheral circuits of an electronic device in detail according to an embodiment.
Figure 5B:
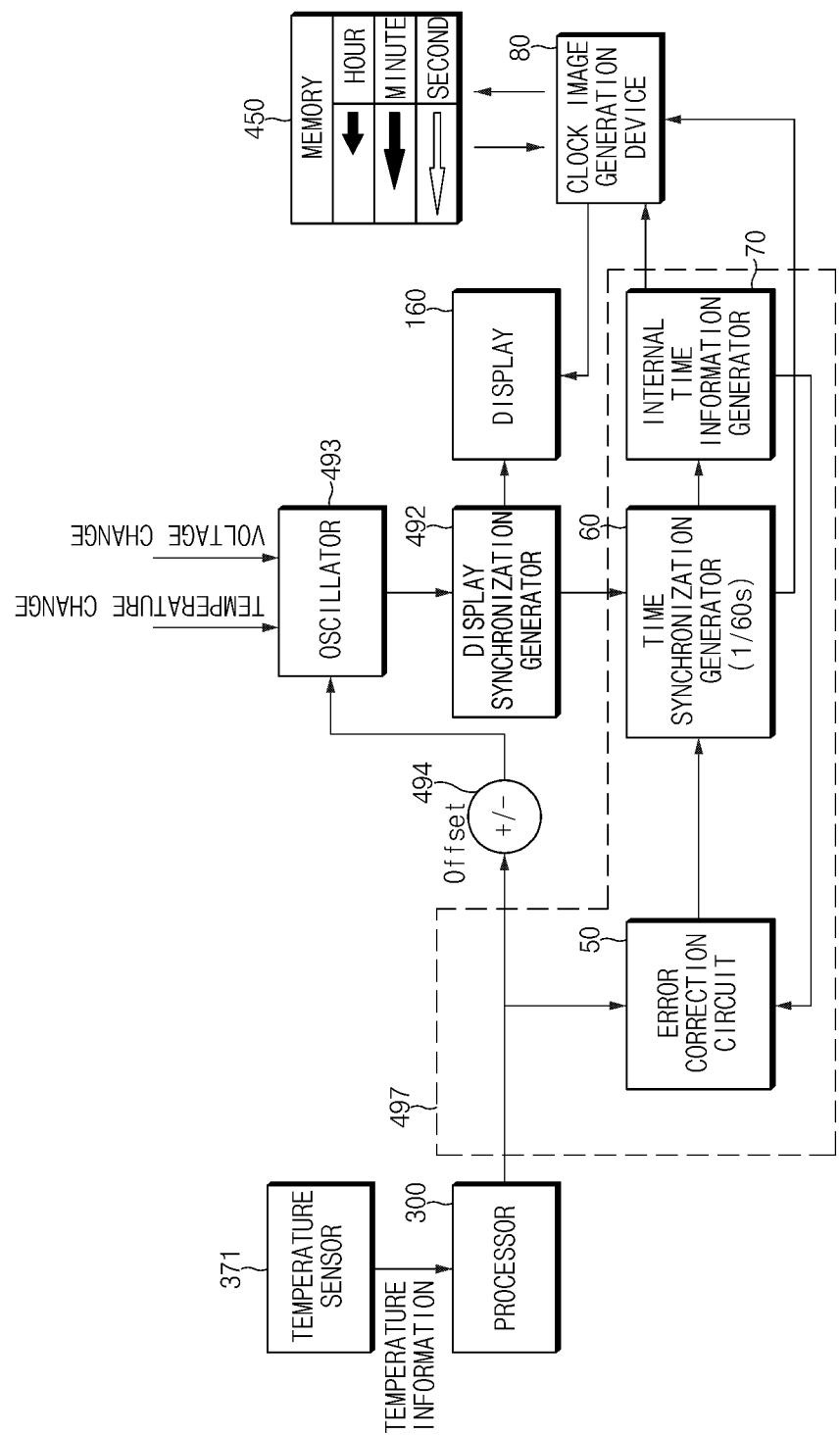

FIGS. 5A and 5B are diagrams illustrating a time correction circuit 497 and related peripheral circuits of an electronic device in detail according to an embodiment.

According to an embodiment, the electronic device 101 may include the temperature sensor 371, the at least one processor 300, the oscillator 493, an offset processing unit 494, the time correction circuit 497, a display synchronization generator 492, the display 160, a clock image generation device 80, or the memory 450.

According to an embodiment, as illustrated in FIG. 5A, the time correction circuit 497 may include a time comparison circuit 40, an error correction circuit 50, a time synchronization generator 60, or an internal time information generator 70.

According to an embodiment, the temperature sensor 371 may generate temperature information by sensing the temperature at a periphery of the oscillator 493. The temperature sensor 371 may output the temperature information. For example, the temperature sensor 371 may deliver the temperature information to the at least one processor 300. For another example, the temperature sensor 371 may directly deliver the temperature information to the time comparison circuit 40 of the DDI 400.

According to another embodiment, as illustrated in FIG. 5B, the time correction circuit 497 may include the error correction circuit 50, the time synchronization generator 60, or the internal time information generator 70.

According to another embodiment, the temperature sensor 371 may output the temperature information. For example, the temperature sensor 371 may deliver the temperature information to the at least one processor 300. For another example, the temperature sensor 371 may directly deliver the temperature information to the error correction circuit 50 of the DDI 400.

According to an embodiment, the at least one processor 300 may correct the error time occurring during the specified time by reflecting the temperature information. The error time may be a difference value between first time information and second time information corresponding to a reference time (e.g., real time clock (RTC)). The at least one processor 300 may correct an error time between the first time information and the second time information by reflecting the temperature information. The at least one processor 300 may deliver the corrected error time and/or the second time information to the DDI 400. For example, the at least one processor 300 may deliver the second time information and/or the corrected error time to the time comparison circuit 40 included in the time correction circuit 497.

According to an embodiment, the DDI 400 may receive the corrected error time from the at least one processor 300. The DDI 400 may correct the first time information, using the corrected error time. For example, the DDI 400 may correct the first time information by correcting the frequency of the clock signal. For another example, the DDI 400 may correct the number of pulses of the synchronization signal (e.g., vertical synchronization signal Vsync or horizontal synchronization signal Hsync) when an error occurs.

According to an embodiment, the oscillator 493 may be configured to generate a clock signal. The oscillator 493 may deliver a clock signal to the display synchronization generator 492. The oscillator 493 may be embedded in the DDI 400 or disposed adjacent to the DDI 400, and thus the oscillator 493 may be affected by the DDI 400 or environmental factors (e.g., temperature change or voltage change) of a portion adjacent to the DDI 400. When the oscillator 493 is affected by the environmental factors, the frequency of the clock signal may be changed.

According to an embodiment, the display synchronization generator 492 may generate a synchronization signal. The display synchronization generator 492 may supply the synchronization signal to the display 160. The display synchronization generator 492 may provide a display synchronization signal to the time synchronization generator 60.

According to an embodiment, the time comparison circuit 40 may generate an offset value of a clock signal, using the corrected error time. The time comparison circuit 40 may correct the frequency of the clock signal of the oscillator 493 by delivering the offset value of the clock signal to the offset processing unit 494.

According to an embodiment, the error correction circuit 50 may receive the corrected first time information. For example, as illustrated in FIG. 5A, the error correction circuit 50 may receive the corrected first time information from the time comparison circuit 40. For another example, as illustrated in FIG. 5B, the error correction circuit 50 may receive the corrected first time information from the at least one processor 300. The error correction circuit 50 may calculate the value (e.g., the number of pulses of the synchronization signal during a specified period) required to correct the synchronization signal of the display 160. For example, when an error of (+)1 second occurs while the display 160 is driven at a frequency of 60 Hz, the error correction circuit 50 may correct the synchronization signal to generate the synchronization signal for 60 seconds at a frequency of 59 Hz.

According to an embodiment, the time synchronization generator 60 may generate time synchronization corresponding to the first time information based on the synchronization signal provided by the display synchronization generator 492. The time synchronization generator 60 may correct the time synchronization value based on correction data that the error correction circuit 50 provides. For example, when a positive error occurs, the time synchronization generator 60 may decrease the time synchronization value to 1/60 s or less. For another example, when a negative error occurs, the time synchronization generator 60 may increase the time synchronization value to 1/60 s or more. The time synchronization generator 60 may deliver the corrected time synchronization value to the internal time information generator 70.

According to an embodiment, the internal time information generator 70 may generate the corrected first time information, using the second time information and the corrected error time, which are delivered from the at least one processor 300. The internal time information generator 70 may generate the first time information based on the second time information when the display 160 is driven initially. The internal time information generator 70 may correct an error occurring in first time information during a specified time, using the corrected error time.

According to an embodiment, the clock image generation device 80 may generate a clock image corresponding to a current time based on a clock image stored in the memory 450 and the first time information that the internal time information generator 70 delivered. The clock image corresponding to the current time may be stored and operated in a separate auxiliary memory. While the at least one processor 300 is in an active state or a wake-up state, the clock image corresponding to the current time may be information that is received and stored from the at least one processor 300. The clock image may be changed according to a user manipulation.

In an embodiment, the DDI 400 may output the corrected first time information to the watch screen 301 displayed in a low power mode, through the display 160. For example, the DDI 400 may output the watch screen, to which an AOD function is applied, through the display 160. When the watch screen 301 maintains the same watch image, the DDI 400 may display the corrected first time information in a state where the at least one processor 300 is in an inactive state. When the user makes a request for changing the clock image to which the AOD function is applied, the at least one processor 300 may be activated to display the changed clock image.

Figure 5C:
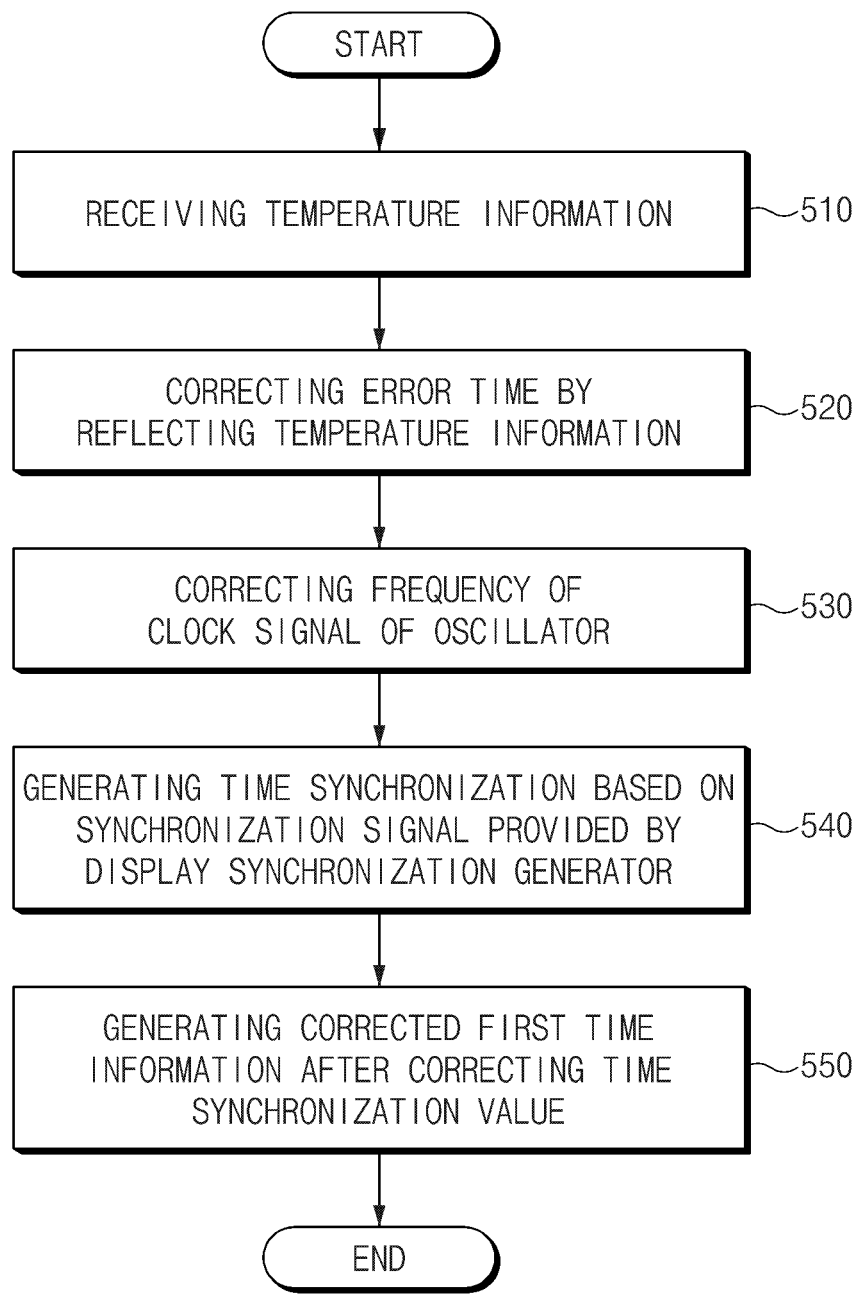
FIG. 5C is a flowchart illustrating driving of a time correction circuit and related peripheral circuits of an electronic device according to an embodiment.

FIG. 5C is a flowchart illustrating the driving of the time correction circuit 497 and related peripheral circuits of the electronic device 101 according to an embodiment.

According to an embodiment, in operation 510, the time correction circuit 497 may receive temperature information. For example, the temperature sensor 371 may transmit the temperature information to the at least one processor 300; the at least one processor 300 may deliver the temperature information to the time correction circuit 497. For another example, the temperature sensor 371 may directly deliver the temperature information to the time correction circuit 497 included in the DDI 400.

According to an embodiment, in operation 520, the time correction circuit 497 may correct an error time by reflecting the temperature information. For example, the at least one processor 300 may correct the error time by reflecting the temperature information, and may deliver the corrected error time to the time correction circuit 497. For another example, the time correction circuit 497 may correct the error time by reflecting the temperature information delivered from the temperature sensor 371.

According to an embodiment, in operation 530, the time correction circuit 497 may correct the frequency of the clock signal of the oscillator 493. For example, the time comparison circuit 40 of the time correction circuit 497 may generate an offset value of the clock signal, using the corrected error time delivered from the at least one processor 300, and may correct the frequency of the clock signal of the oscillator 493 by delivering the offset value to the offset processing unit 494. For another example, the frequency of the clock signal of the oscillator 493 may be corrected by directly using the second time information delivered from the at least one processor 300.

According to an embodiment, in operation 540, the time correction circuit 497 may generate time synchronization based on a synchronization signal provided by the display synchronization generator 492. The time synchronization generator 60 may generate time synchronization corresponding to the first time information based on the synchronization signal provided by the display synchronization generator 492.

According to an embodiment, in operation 550, the time correction circuit 497 may generate the corrected first time information after correcting the time synchronization value. The time synchronization generator 60 may deliver the corrected time synchronization value to the internal time information generator 70. The internal time information generator 70 may generate the corrected first time information, using the second time information and the corrected error time, which are delivered from the at least one processor 300.

Figure 6A:
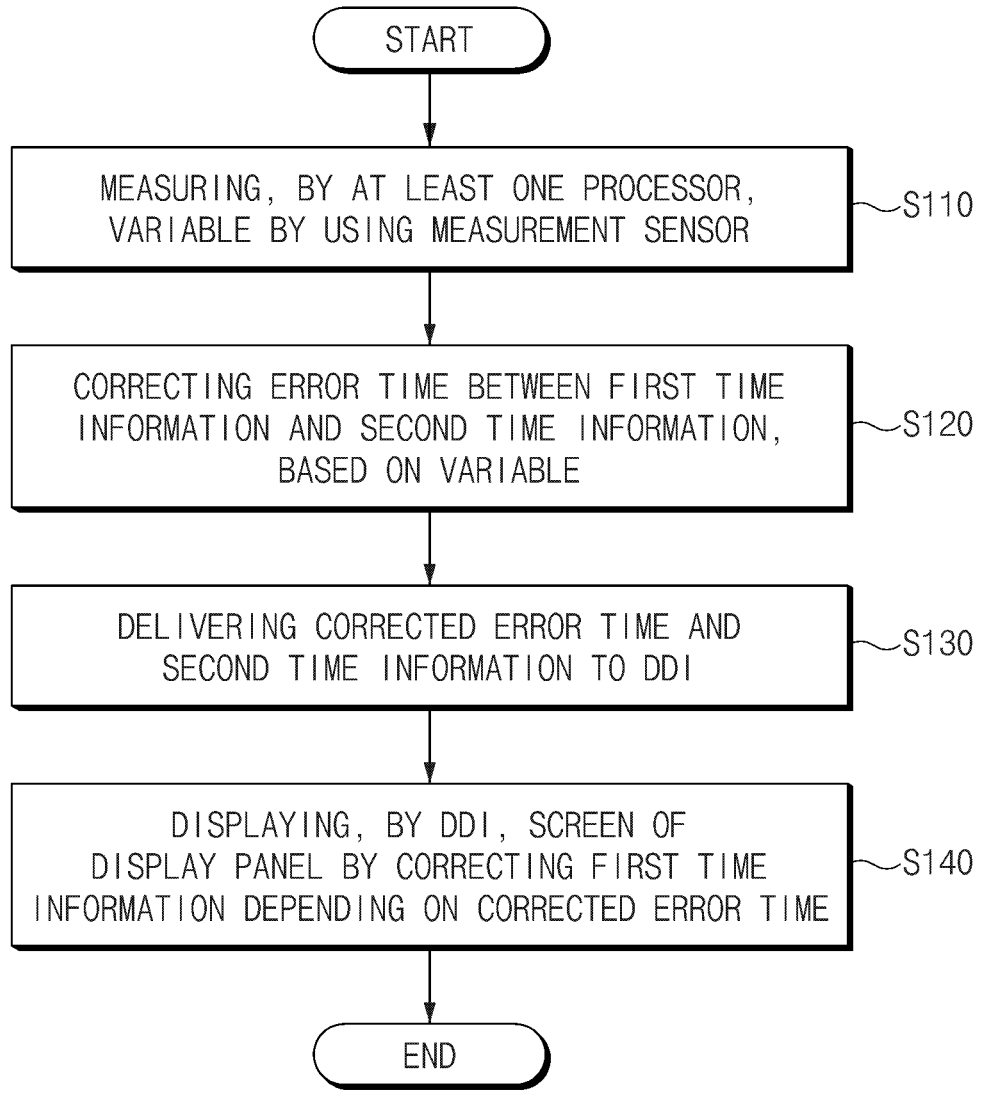
FIGS. 6A and 6B are flowcharts illustrating various methods, in which an electronic device corrects an error time occurring during a specified time, according to an embodiment.

FIG. 6A is a flowchart illustrating a method, in which the electronic device 101 corrects an error time occurring during a specified time, according to an embodiment.

According to an embodiment, in operation S110, the at least one processor 300 of the electronic device 101 may measure a variable, using the measurement sensor 370. The measurement sensor 370 may measure a variable associated with an external environment of the electronic device 101 or an environmental variable capable of affecting the oscillator 493 that generates a clock signal. For example, the measurement sensor 370 may measure temperature at a periphery of the oscillator 493. The at least one processor 300 may receive a variable from the measurement sensor 370. For example, the at least one processor 300 may receive temperature information according to a temperature change measured by the temperature sensor 371.

According to an embodiment, in operation S120, the at least one processor 300 of the electronic device 101 may correct information (e.g., an error time) associated with the error time between the first time information and the second time information, based on a variable. The error time may include a difference between the first time information generated by the DDI 400 and the second time information corresponding to a reference time.

According to an embodiment, in operation S130, the at least one processor 300 of the electronic device 101 may deliver the corrected error time and the second time information to the DDI 400. The at least one processor 300 may be configured to provide the corrected error time and to compare the first time information with the second time information during a specified time such that the DDI 400 corrects all the occurring errors. The at least one processor 300 may maintain an inactive state or a sleep state during a specified time in which image data and corrected error information are not delivered to the DDI 400.

According to an embodiment, in operation S140, the DDI 400 of the electronic device 101 may be configured to display the screen of the display panel 200 by correcting the first time information depending on the corrected error time. For example, the time correction circuit 497 of the DDI 400 may receive the corrected error time and the second time information corresponding to the reference time from the at least one processor 300 for each specified time, and may correct the first time information by identifying the difference between the second time information and the current first time information or by reflecting the corrected error time. For another example, the time correction circuit 497 may correct a value of the first time information by adding or subtracting the corrected error time from the current first time information for each specified time.

According to an embodiment, with regard to a cycle change in the time synchronization, the time correction circuit 497 may correct the number of pulses, which the synchronization signal has, during one frame. The time correction circuit 497 may process time compensation by correcting the number of pulses of a vertical synchronization signal Vsync that generates a specified time unit (e.g., 1 second). For example, when the frame frequency is set (e.g., 60 Hz) to output 60 frames at the specified time (e.g., 1 second), it is possible to compensate for the first time information by decreasing or increasing the number of 60 frame syncs (e.g., by applying 59 frame syncs to 1 second or by applying 61 frame syncs to 1 second).

Figure 6B:
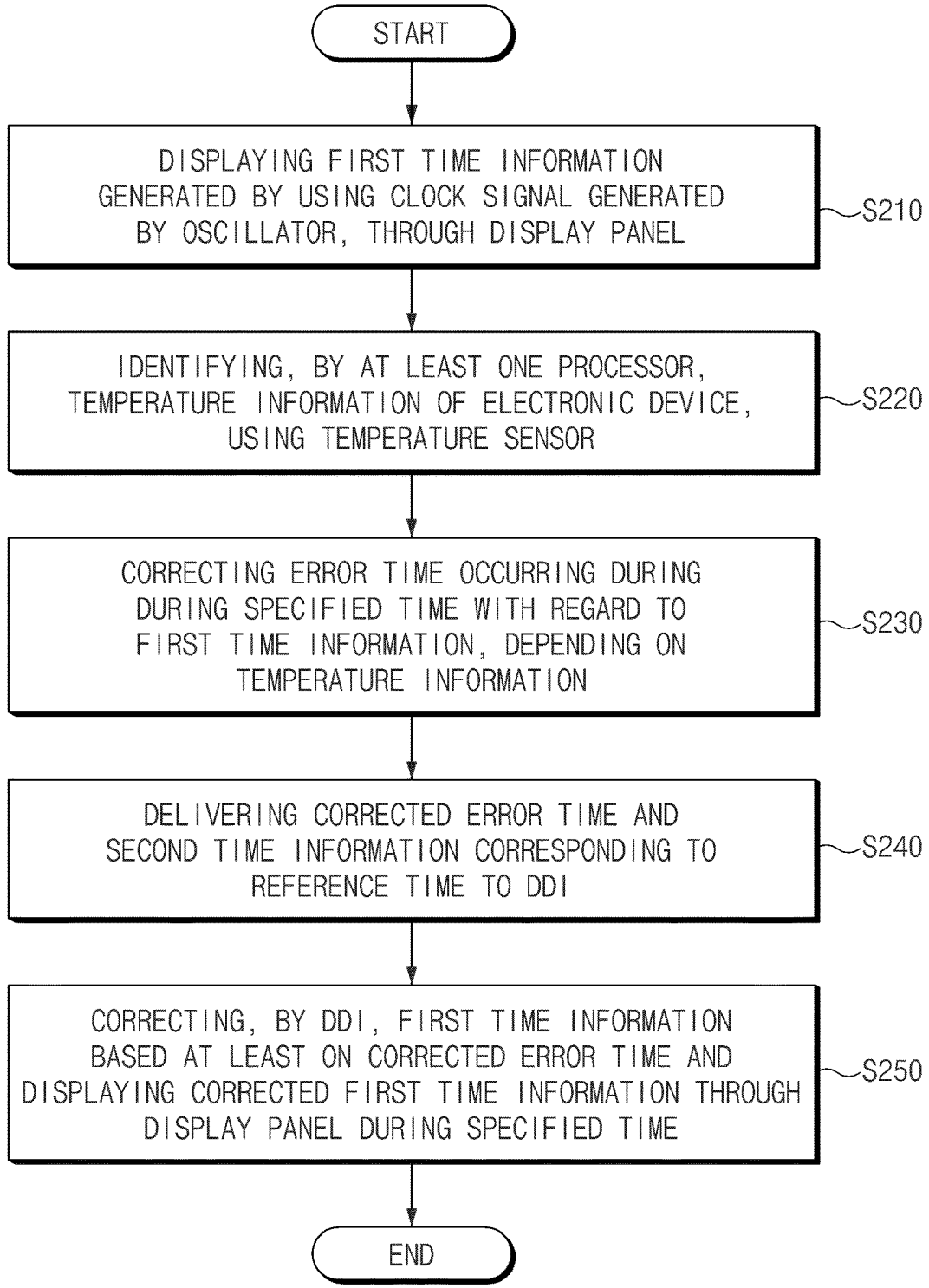

FIG. 6B is a flowchart illustrating another method, in which the electronic device 101 corrects an error time occurring during a specified time, according to an embodiment.

According to an embodiment, in operation S210, the electronic device 101 may display first time information generated by using the clock signal generated by the oscillator 493, through the display panel 200. The clock image stored in the memory 450 of the DDI 400 may include hand images or digital number images respectively corresponding to an hour, a minute, and a second. The clock image generation device 80 may generate a clock image corresponding to the current time, using the first time information. For example, the clock image generation device 80 may generate a clock image by adjusting locations and/or shapes of hand images or digital number images respectively corresponding to an hour, a minute, and a second, using the first time information. The clock image generation device 80 may deliver a clock image corresponding to the current time to the display 160 to display a screen corresponding to first clock information on the display panel 200.

According to an embodiment, in operation S220, the at least one processor 300 of the electronic device 101 may identify temperature information of the electronic device 101, using the temperature sensor 371. The frequency of the clock signal generated by the oscillator 493 may be changed depending on the temperature information measured by the temperature sensor 371. The at least one processor 300 may receive the temperature information to predict an extent to which the frequency of a clock signal is changed depending on a change in temperature. The at least one processor 300 may predict an error degree of the first time information depending on a change in frequency.

According to an embodiment, in operation S230, the at least one processor 300 of the electronic device 101 may correct an error time occurring during a specified time with regard to the first time information, depending on the temperature information. The at least one processor 300 may correct the error time by predicting the error degree occurring during a specified time of the first time information depending on a change in temperature information. For example, when the first time information has an error time of 1 second per 10 minutes in temperature information of 20° C., the at least one processor 300 may set the error time to correct 1 second during the next period of 10 minutes. When the temperature information is changed to 30° C., it may be predicted that the first time information has an error time of 1.5 seconds per 10 minutes. The at least one processor 300 may correct the error time to correct 1.5 seconds during the next period of 10 minutes.

According to an embodiment, in operation S240, the at least one processor 300 of the electronic device 101 may deliver the corrected error time and second time information corresponding to a reference time to the DDI 400. The time correction circuit 497 of the DDI 400 may receive the corrected error time and the second time information from the at least one processor 300.

According to an embodiment, in operation S250, the DDI 400 of the electronic device 101 may correct the first time information based at least on the corrected error time and may display the corrected first time information through the display panel 200 during a specified time. The TCON 490 of the DDI 400 may control the display panel 200 to display the first time information during a specified time based on the synchronization signal corrected by the time correction circuit 497.

Figure 7:
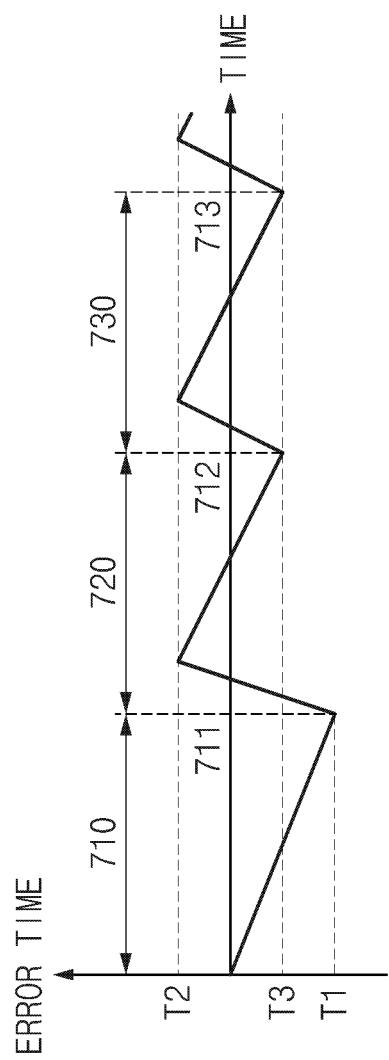
FIG. 7 is a graph illustrating a method, in which at least one processor corrects an error time over time, according to an embodiment.

FIG. 7 is a graph illustrating a method, in which the at least one processor 300 corrects an error time over time, according to an embodiment.

According to an embodiment, the at least one processor 300 may deliver the corrected error time and second time information to the DDI 400 for each specified time point 711, 712, and 713. For example, the at least one processor 300 may wake up or be activated for each specified time point 711, 712, and 713 in a cycle of a specified time 710, 720, or 730. For another example, the at least one processor 300 may be activated when a variable value measured through the measurement sensor 370 or a temperature value measured through the temperature sensor 371 is not less than or is not greater than a specified value. The at least one processor 300 may be activated to determine an overcompensation value. The at least one processor 300 may receive variables or temperature information for each specified time point 711, 712, and 713. The at least one processor 300 may provide information, which allows the DDI 400 to correct the first time information, in the cycle of the specified time 710, 720, or 730.

According to an embodiment, the at least one processor 300 may correct the error time by a specified first range at the first time point 711 that is a time point at which the first time information is first corrected. The first range may be greater than the error time. For example, the error time at the first time point 711 may be the first time T1. However, the time corrected at the first time point 711 may be a time obtained by adding the second time T2 to the first time T1. For example, when an error time of −1 seconds occurs up to the first time point 711, the overcompensation that compensates for the time of 1.5 seconds greater than 1 second may proceed at the first time point 711.

According to an embodiment, the at least one processor 300 may display the first time information through the display panel 200 during the specified times 720 and 730 after the first time point 711, and then may correct the first time information by the error time occurring during the specified times 720 and 730. The at least one processor 300 may correct the first time information by a sum obtained by adding the second value T2 and the third value T3, each of which is the error time occurring during the specified time 720, at the second time point 712. The at least one processor 300 may correct the first time information by a sum obtained by adding the second value T2 and the third value T3, each of which is the error time occurring during the specified time 730, at the third time point 713.

According to an embodiment, when the overcompensation proceeds at the first time point 711, the compensation may proceed by the error time occurring during the specified time 720 or 730 at the second time point 712 or the third time point 713, which is the time point at which the at least one processor 300 corrects the first time information afterward. When the compensation proceeds by the error time occurring during the specified time 720 or 730 at the second time point 712 or the third time point 713, the maximum value of the error time occurring during the specified time 720 or 730 may be reduced. For example, the magnitude of the maximum error time before the overcompensation proceeds in the period 710 may be the first time T1; the magnitude of the maximum error time in the period 720 or 730 after the overcompensation proceeds at the first time point 711 may be the second time T2 or the third time T3, which is smaller than the first time T1. Accordingly, the maximum value of the error time may be reduced when information for correcting the first time information is provided by waking up at the cycle of the specified time 710, 720 or 730.

Figure 8:
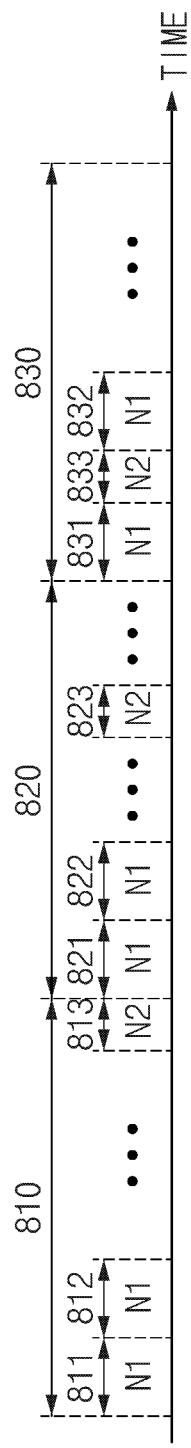
FIG. 8 is a graph illustrating a method, in which a DDI corrects first time information as time goes on, according to an embodiment.

FIG. 8 is a graph illustrating a method, in which the DDI 400 corrects first time information as time goes on, according to an embodiment.

According to an embodiment, the DDI 400 may generate a synchronization signal based on a clock signal. The synchronization signal may have a plurality of pulses during a pre-defined period 810, 820, or 830.

According to an embodiment, the DDI 400 may adjust the number of pulses included in the synchronization signal during sub-periods (811~813, 821~823, 831~833) included in the pre-defined period 810, 820, or 830. For example, when the first time information is later than the second time information, the time correction circuit 497 of the DDI 400 may correct the first time information by increasing the number of pulses of the synchronization signal generated by the TCON 490; when the first time information is earlier than the second time information, the time correction circuit 497 of the DDI 400 may correct the first time information by decreasing the number of pulses of the synchronization signal. For another example, when the first time information is later than the second time information, the time correction circuit 497 may correct the first time information by decreasing the number of pulses of the synchronization signal referenced to calculate a specified time; when the first time information is faster than the second time information, the time correction circuit 497 may correct the first time information by increasing the number of pulses of the synchronization signal referenced to calculate the specified time. The number of pulses of the synchronization signal per cycle may be originally defined as N1; the number of pulses of the changed synchronization signal may be defined as N2. In this case, the sub-periods (811~812, 821~822, 831~832) in which the number of pulses is N1 may be defined as a period in which the first time information is not corrected. Also, the sub-period 813, 823, or 833 where the number of pulses is changed to N2 may be defined as a period for correcting the first time information.

According to an embodiment, the DDI 400 may correct the first time information while spreading and reflecting the corrected error time to the first time information. When the number of pulses of the synchronization signal is changed only in the single period 810, a phenomenon that the time on the screen displayed on the display panel 200 according to the change in the number of pulses in the period 810 temporarily quickly or slowly goes on in the compensation period may be visually perceived by the user. When the error information occurring during the pre-defined period 810, 820, or 830 is corrected, in the case where the sub-periods 813, 823, and 833 where the number of pulses is changed from N1 to N2 are respectively distributed and arranged in the pre-defined periods 810, 820, and 830, the number of pulses may be uniformly changed in the pre-defined periods 810, 820, and 830. Accordingly, even when the first time information is corrected by reflecting the corrected error time, it is possible to reduce a phenomenon that sub-periods 813, 823, and 833 where the correction is made in the display panel 200 are visually perceived.

Figure 9:
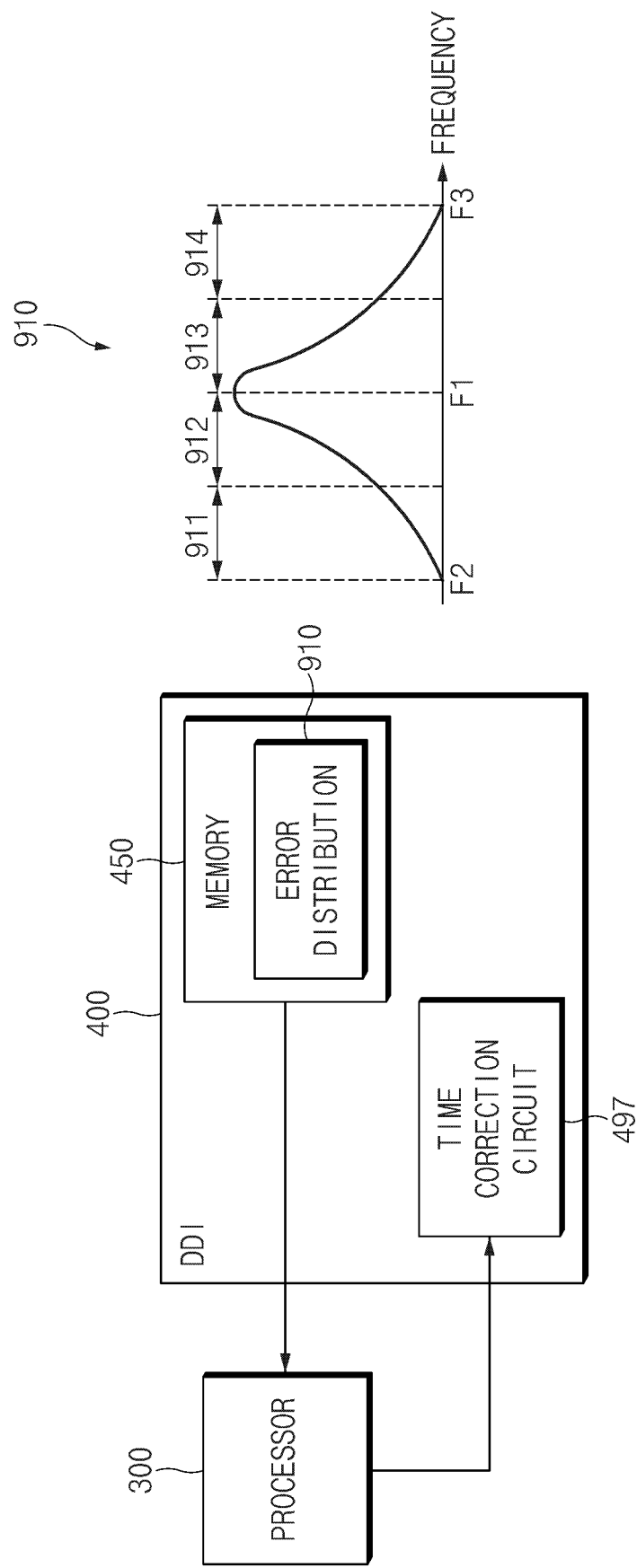
FIG. 9 is a block diagram illustrating a case of correcting first time information by storing an error distribution in a memory of an electronic device according to an embodiment.

FIG. 9 is a block diagram illustrating a case of correcting first time information by storing an error distribution 910 in the memory 450 of the electronic device 101 according to an embodiment.

According to an embodiment, the DDI 400 may correct first time information based on the error distribution 910 stored in the memory 450. The memory 450 storing the error distribution 910 may be a read only memory (ROM) or an electronic fuse (eFuse). The error distribution 910 may be data indicating the frequency distribution of a clock signal. The error distribution 910 may be represented as a graph including a plurality of periods 911 to 914 according to a frequency.

According to an embodiment, the error distribution 910 may have a center frequency of the clock signal or a first frequency F1, which is a frequency when an error of the first time information generated using the clock signal does not occur. The error distribution 910 may include periods 912 and 913 adjacent to the first frequency F1. Furthermore, the error distribution 910 may include a period 911 adjacent to the second frequency F2, which is the minimum frequency of the clock signal, and a period 914 adjacent to the third frequency F3, which is the maximum frequency of the clock signal.

According to an embodiment, the error distribution 910 may be written to the memory 450 during a process of manufacturing the DDI 400. The error distribution 910 may be modified by reflecting the variable of the DDI 400. For example, the error distribution 910 may be corrected by reflecting temperature information at a periphery of the DDI 400.

According to an embodiment, the at least one processor 300 may receive the error distribution 910 from the memory 450. The at least one processor 300 may correct an error time occurring between the first time information and the second time information, during a specified time by reflecting the error distribution. The at least one processor 300 may supply the second time information and the error time corrected by reflecting the error distribution to the time correction circuit 497 of the DDI 400. For another example, the error distribution 910 may be directly delivered to the time correction circuit 497.

According to an embodiment, for example, the time correction circuit 497 may correct the first time information, using the corrected error time and the second time information delivered from the at least one processor 300. For another example, the time correction circuit 497 may correct the first time information by reflecting the error distribution 910 stored in the memory 450. The time correction circuit 497 may be configured such that the display 160 displays a screen by using the corrected first time information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display panel;
an oscillator configured to generate a clock signal;
a display driving integrated circuit (DDI) configured to generate first time information, using the clock signal;
a sensor; and
at least one processor configured to identify a variable measured by using the sensor or second time information corresponding to a reference time,
wherein the at least one processor is configured to:
measure the variable, using the sensor;
correct an error time between the first time information and the second time information corresponding to the reference time, based on the variable; and
deliver the corrected error time or the second time information to the DDI such that the DDI corrects the first time information based on the corrected error time to display a screen of the display panel,
wherein the at least one processor is further configured to:
correct the error time by a specified first range at a first time point that is a time point at which the first time information is corrected first, and
wherein the first range is greater than the error time.

2. The electronic device of claim 1, wherein the oscillator is disposed inside the DDI.

3. The electronic device of claim 1, wherein the oscillator is disposed outside the DDI to be adjacent to the DDI.

4. The electronic device of claim 1, wherein the at least one processor is configured to:
predict and correct the error time between the first time information and the second time information, which is to occur during a specified time, based on the variable; and
deliver the corrected error time or the second time information to the DDI for the respective specified time.

5. The electronic device of claim 1, wherein the DDI generates a synchronization signal based on the clock signal and adjusts a number of pulses included in the synchronization signal during a pre-defined period.

6. The electronic device of claim 1, wherein the DDI corrects the first time information while spreading and reflecting the corrected error time to the first time information.

7. The electronic device of claim 1, wherein the DDI corrects the first time information based on an error distribution of the oscillator stored in a memory, and
wherein the at least one processor is configured to:
receive the error distribution from the memory; and
supply the corrected error time or the second time information to the DDI by reflecting the error distribution.

8. An electronic device comprising:
a display panel;
an oscillator configured to generate a clock signal;
a DDI configured to display first time information generated by using the clock signal, through the display panel;
a temperature sensor; and at least one processor configured to identify temperature information measured by using the temperature sensor or second time information corresponding to a reference time, wherein the at least one processor is configured to:

identify the temperature information of the electronic device, using the temperature sensor;

correct an error time occurring during a specified time, depending on the temperature information in association with the first time information; and deliver the corrected error time or the second time information corresponding to a reference time to the DDI such that the DDI corrects the first time information based at least on the corrected error time to display the corrected first time information through the display panel during the specified time, wherein the at least one processor is further configured to:

correct the error time by a specified first range at a first time point that is a time point at which the first time information is corrected first, and wherein the first range is greater than the error time.

9. The electronic device of claim 8, wherein the at least one processor is configured to:

correct the first time information by the error time occurring during the specified time after displaying the first time information through the display panel during the specified time after the first time point.

10. The electronic device of claim 8, wherein the DDI generates a synchronization signal based on the clock signal and adjusts a number of pulses included in the synchronization signal during a pre-defined period.

11. The electronic device of claim 8, wherein the at least one processor is configured to:

deliver the second time information or the corrected error time to the DDI for the respective specified time.

12. The electronic device of claim 8, wherein the DDI outputs the corrected first time information to a watch screen displayed in a low-power mode through the display panel.

13. The electronic device of claim 8, wherein the DDI spreads and corrects the corrected first time information during the specified time.

* * * * *